US006043477A

United States Patent [19]

Timmermans

[11] Patent Number: 6,043,477

[45] Date of Patent: Mar. 28, 2000

[54] APPARATUS AND METHOD FOR OPERATING DEVICES

[75] Inventor: Antonius Stephanus Maria Timmermans, AC Leiden, Netherlands

[73] Assignee: Laserpromotions B.V., Netherlands

[21] Appl. No.: 09/187,695

[22] Filed: Nov. 6, 1998

[30] Foreign Application Priority Data

Nov. 7, 1997 [NL] Netherlands ........................... 1007493

[51] Int. Cl.[7] ........................................................ G01J 1/32

[52] U.S. Cl. ............................................ 250/205; 250/221

[58] Field of Search .................................... 250/205, 221, 250/222.1; 356/225, 213; 345/157; 340/825.06

[56] References Cited

U.S. PATENT DOCUMENTS

| | | | |
|---|---|---|---|
| 4,878,050 | 10/1989 | Kelley | 340/825.06 |
| 5,515,079 | 5/1996 | Hauck | 345/157 |
| 5,541,695 | 7/1996 | Teremy et al. | 396/59 |
| 5,786,890 | 7/1998 | Noh | 356/225 |

FOREIGN PATENT DOCUMENTS

| | | | |
|---|---|---|---|
| 0350776 | 1/1990 | European Pat. Off. | D03D 51/28 |
| 0787968 | 8/1997 | European Pat. Off. | F41G 3/14 |
| 2731290 | 9/1996 | France | G08C 17/02 |
| 4307351 | 9/1994 | Germany | E04H 3/26 |
| 2220522 | 1/1990 | United Kingdom | G05D 25/02 |
| 2259172 | 3/1993 | United Kingdom | G08C 23/00 |

*Primary Examiner*—Frank G. Font
*Assistant Examiner*—Layla Lauchman
*Attorney, Agent, or Firm*—Webb Ziesenheim Logsdon Orkin & Hanson, P.C.

[57] ABSTRACT

An apparatus for operating devices such as image, light and/or sound equipment, electromechanical equipment and so on, has at least one laser source for generating a continuous operating laser beam which is directed continuously, with or without reflection, at one or more sensors responding to light flux variations of the laser beam, and a control circuit containing each sensor for controlling the devices the laser beam generated by the laser source is wholly or partially masked so that physical contact with wear-susceptible operating means is not necessary and an object, for instance a hand, is simply placed into the laser beam.

6 Claims, 5 Drawing Sheets

APPARATUS AND METHOD FOR OPERATING DEVICES

BACKGROUND OF THE INVENTION

1. Field of the Invention

The present invention relates to an apparatus and a method for operating devices such as image, light and/or sound equipment, electromechanical equipment and so on.

2. Description of the Prior Art

People are confronted daily with all kinds of devices they wish to operate: the television is thus switched on and the choice of signal, the volume, the sound etc. is adjusted with a remote control, a similar type of control is required to make the music centre function as desired and light switches and dimmer switches are operated to illuminate a room area. A drawback to operating devices in this manner is that physical contact is always necessary with the operating means, such as buttons, touch controls etc., whereby the operating means is subject to wear.

SUMMARY OF THE INVENTION

The object of the present invention is to obviate the above stated drawback in the operation of devices. An apparatus is provided for this purpose which comprises at least one laser source for generating a continuous operating laser beam which is directed continuously, with or without reflection, at one or more sensors responding to light flux variations of the laser beam, and a control circuit containing each sensor for controlling the devices.

Variation in the light flux of the operating laser beam can be brought about simply by means of placing an object, for instance a hand, in the laser beam. Physical contact with wear-susceptible operating means is no longer required. An added advantage is that the control operates over great distances, since the operating laser beam can span great distances. Another advantage is that many people can operate a device simultaneously or successively.

Several examples wherein the apparatus according to the present invention could be applied have already been mentioned above. In addition, the apparatus could be used for entertainment. This will be elucidated later using a number of examples. In this field of application the control circuit controls the laser source or the laser sources. One of the advantages hereof is that when the laser beam comes into contact with the human eye, which in determined conditions and at determined intensities of the laser beam can be harmful, the light source generating this laser beam can be switched off. The other advantages will be noted with reference to the relevant applications.

In a preferred embodiment the sensors are incorporated in a video camera. The video camera not only detects whether, but also where in the room area, the laser beam is interrupted. It is hereby possible to determine the position of a person who is affecting the operation of a device using the operating laser beam.

The present invention also provides a method for operating devices using the apparatus according to the present invention, wherein the method is characterized in that the laser beam generated by the laser source is wholly or partially masked. A minimal variation in the light flux of the laser beam is sufficient to operate the devices as required.

BRIEF DESCRIPTION OF THE DRAWINGS

The present invention will be further elucidated with reference to a number of applications which are shown in the annexed drawings. In the drawings.

DETAILED DESCRIPTION OF THE PREFERRED EMBODIMENTS

Figure 1:
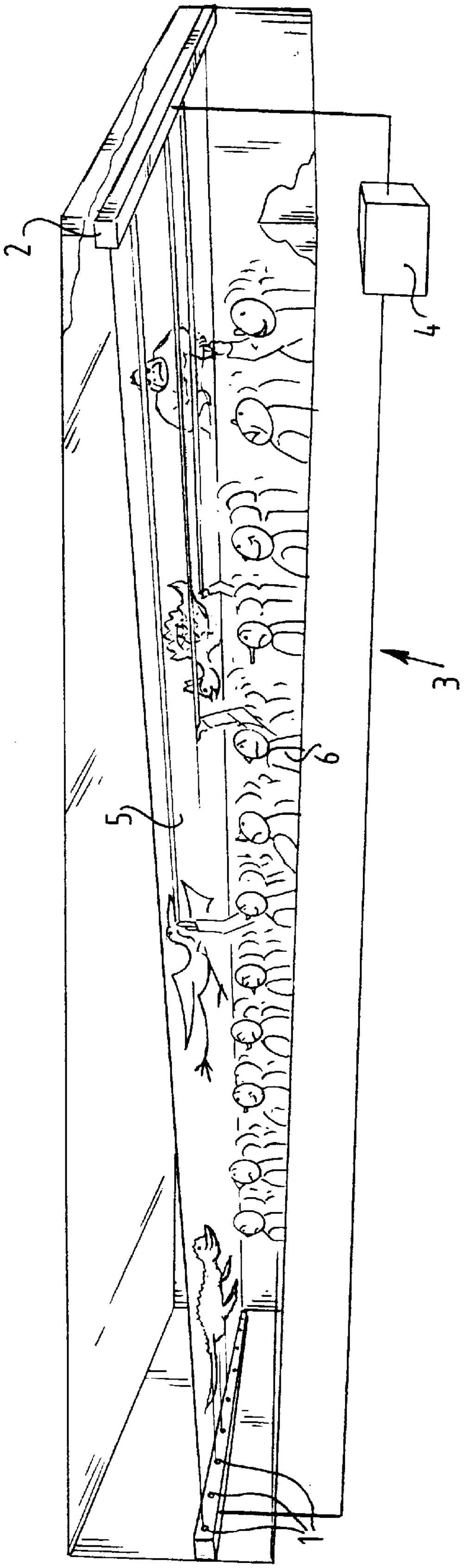
FIG. 1 shows the apparatus and method according to the invention as an application in a waiting area.

FIG. 1 shows a first application of the apparatus and method according to the present invention. In a waiting area, for instance of an amusement park, a number of laser sources 1 is arranged on the one side of the space and a series of sensors 2 on the other side. The sensors are incorporated in a control circuit 3 with a control 4 which controls laser sources 1. Laser sources 1 together generate a plane of visible laser light 5 which is projected just above the heads of the public and which impinges on the series of sensors 2. Sensors 2 respond to light flux variations of the laser light.

When someone 6 from the public places his hand into plane 5, the plane 5 changes shape, intensity and/or colour, optionally subject to which sensor detects the light flux variation and to the control 4 of control circuit 3. An advantage of this application of the apparatus is that the public is entertained while waiting, whereby the time seems to pass more quickly.

Figure 2:
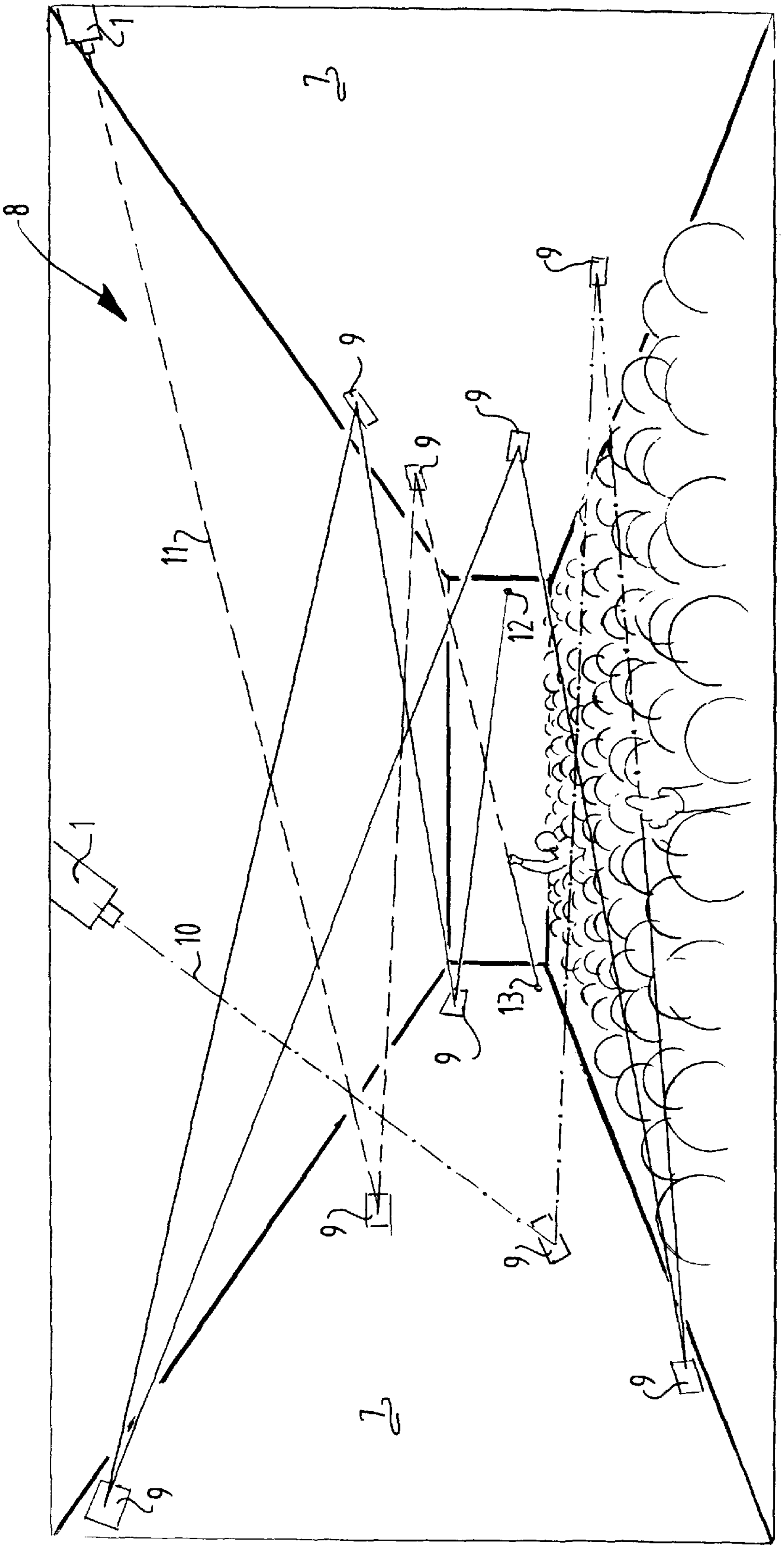
FIG. 2 shows the apparatus and method according to the invention as an application in a laser show.

Using the apparatus and method according to the present invention an interactive laser show can be obtained as shown in FIG. 2. A number of laser sources 1 provides a determined laser projection, optionally depending on the programme the maker of the show has arranged. Mirrors 9 arranged on the walls 7 of a space 8 can be used to reflect laser beams 10, 11 through space 8. Laser beams 10, 11 are eventually received by sensors 12, 13 respectively.

The public can actively influence the laser show by touching a laser beam 10, 11. Whole or partial masking of laser beam 10, 11 is detected by the associated sensor 12, 13 respectively as a variation in the detected light flux. Each sensor 12, 13 is again incorporated in a control circuit—not shown in FIG. 2—which controls laser sources 1. A light flux variation detected by a sensor 12, 13 then results in a change of direction and/or colour of each laser beam 10, 11. Each change can also be accompanied by a sound effect. In an advantageous manner the public can hereby interact with the laser show, which will result in greater enjoyment.

Figure 3:
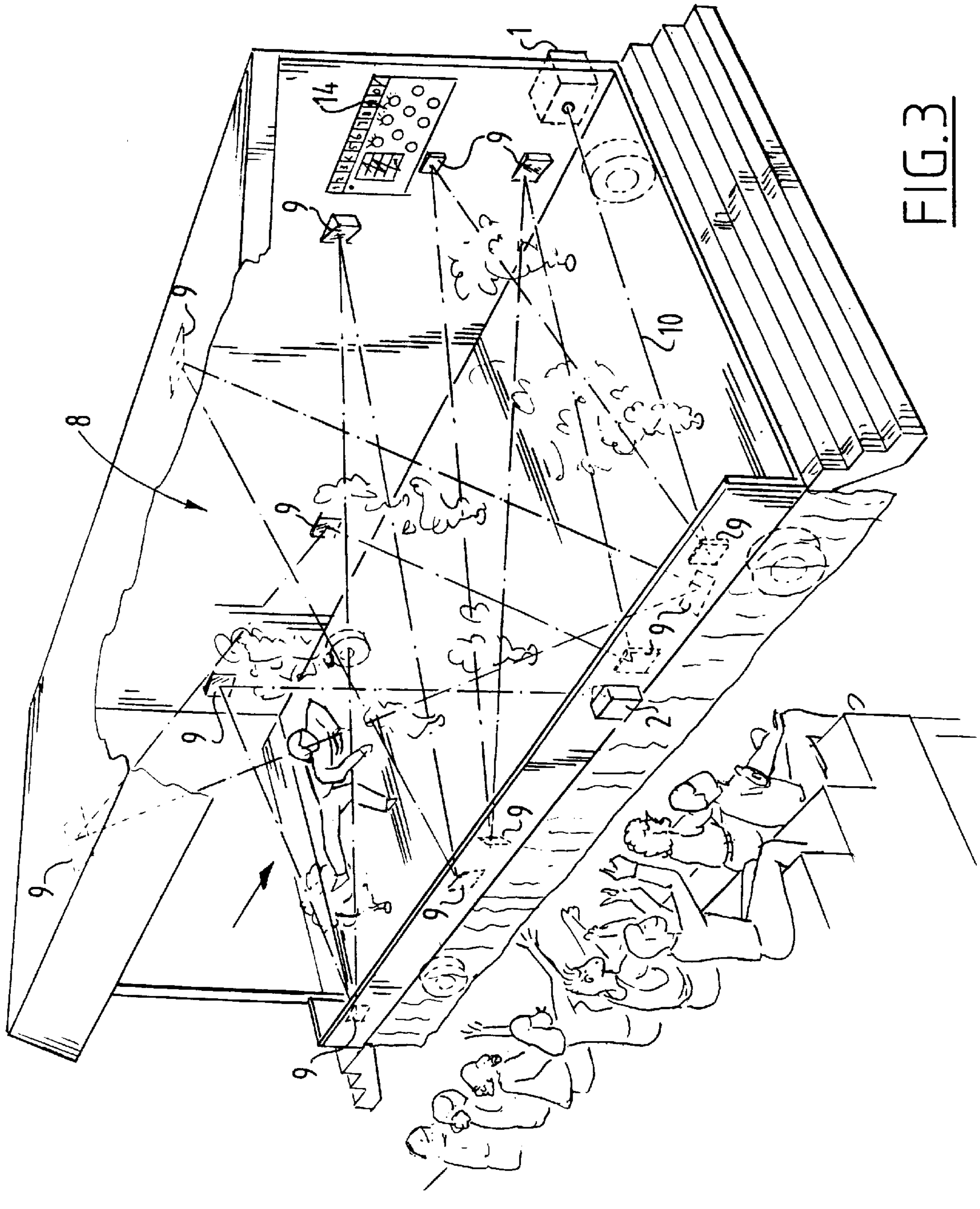
FIG. 3 shows the apparatus and method according to the invention as a laser game.

In FIG. 3 the apparatus and method according to the invention are used as a laser game. In contrast with the foregoing applications, it is precisely the intention here not to touch the laser beam 10. The laser beam 10 generated by laser source 1 is reflected via mirrors 9 arranged in space 8 through this space 8 and eventually impinges upon sensor 2. The control circuit containing sensor 2, which is not shown in FIG. 3, controls a scoreboard 14. Each interruption of laser beam 10 is shown on scoreboard 14. A sound signal can herein also be produced and the laser beam can change colour and/or direction.

Figure 4:
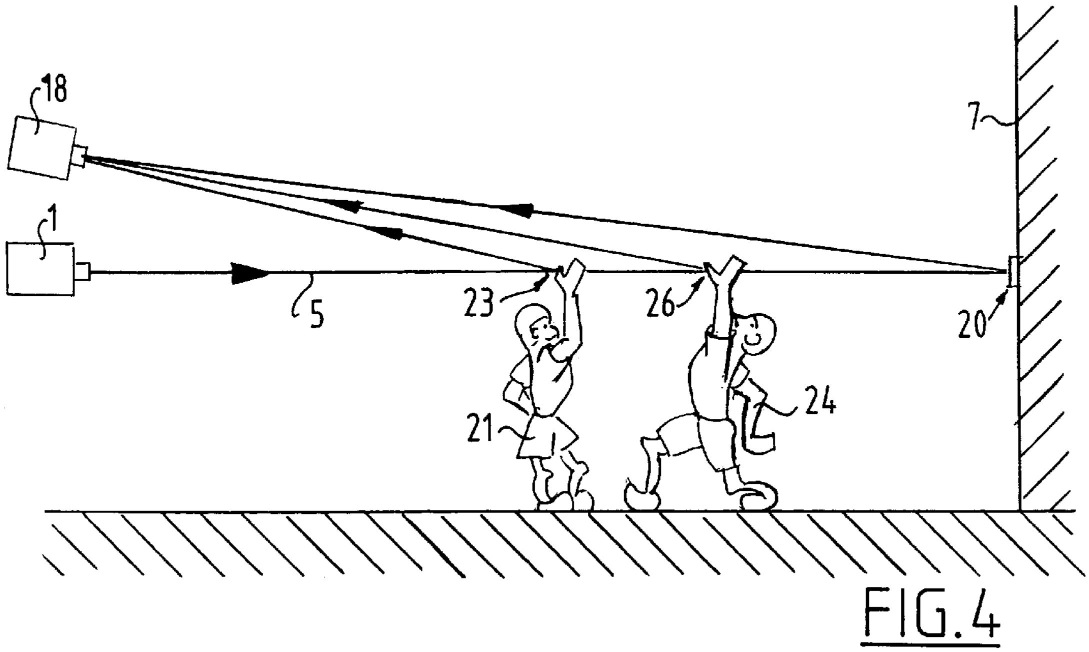
FIG. 4 shows schematically another embodiment of the apparatus wherein a video camera is used.
Figure 5:
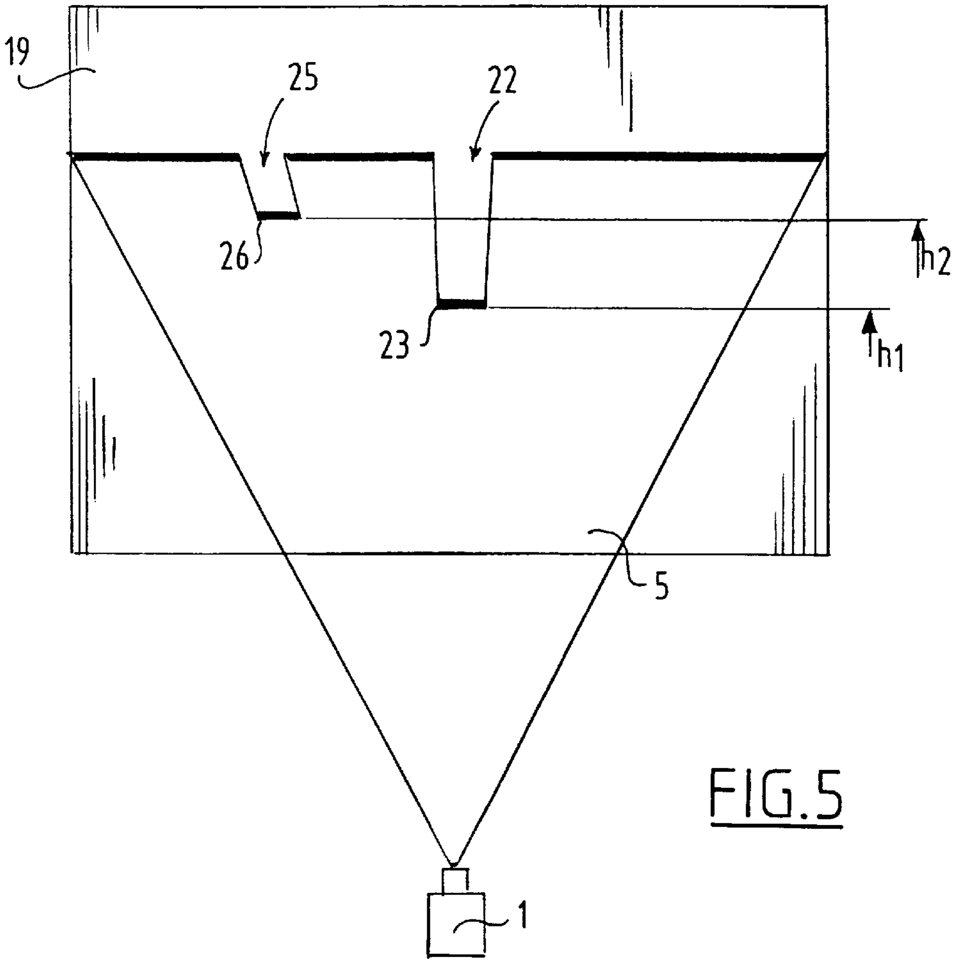
FIG. 5 is a schematic representation of the image which the video camera in FIG. 4 has.

Another embodiment of the apparatus is shown schematically in FIG. 4. In this embodiment the sensors are incorporated in a video camera 18 which is arranged close to and above a laser source 1. FIG. 5 shows a schematic representation from the position of video camera 18, wherein the detection field of video camera 18 is designated with reference numeral 19. Laser source 1 generates a plane of visible laser light 5. Hereby projected onto wall 7 is a line 20 which is detected by video camera 18. When a first person 21 interrupts the laser shape 5 with a hand, video camera 18 will not only detect an interruption 22 in line 20 but also the projection 23 on the hand interrupting laser beam 5. Because video camera 18 is situated at a different location from laser source 1, the projection 23 on the hand will be situated in the camera field 19 at a height differing from the projection of line 20 on wall 7. It is hereby possible to establish the position of the raised hand, and therefore of the person, in the space. The height hi of the projection 23 in detection field 19 of video camera 18 is thus a measure of the position of the person 21 causing the projection 23. A second person 24 is standing further away from video camera 18 and likewise interrupts the laser shape 5 with his hand. Once again the video camera not only detects an interruption 25 of line 20 but also a projection 26 on the hand of the person 24. This projection 26 is detected at height h2 in the camera field 19, wherein h2>h1 (person 24 is standing further away than person 21). The height hi, h2 is a measure of the “depth” position of the person. In addition, the interruption 22, 25 of line 20, but also the projection 23, 26 of the hand, is a measure of the “width” position of the person. The video camera is thus capable of detecting various hands simultaneously and of determining the positions of the people in the space. By means of light flux variations detected by the video camera, position information is obtained which can be used to operate devices. It is for instance possible to generate sound effects and/or light effects at the location where the hand interrupts the laser beam. An advantage of the use of a video camera is that it is not necessary to arrange a large number of sensors in the space and to arrange connections throughout the entire space between the sensors and the rest of the control circuit.

Figure 6:
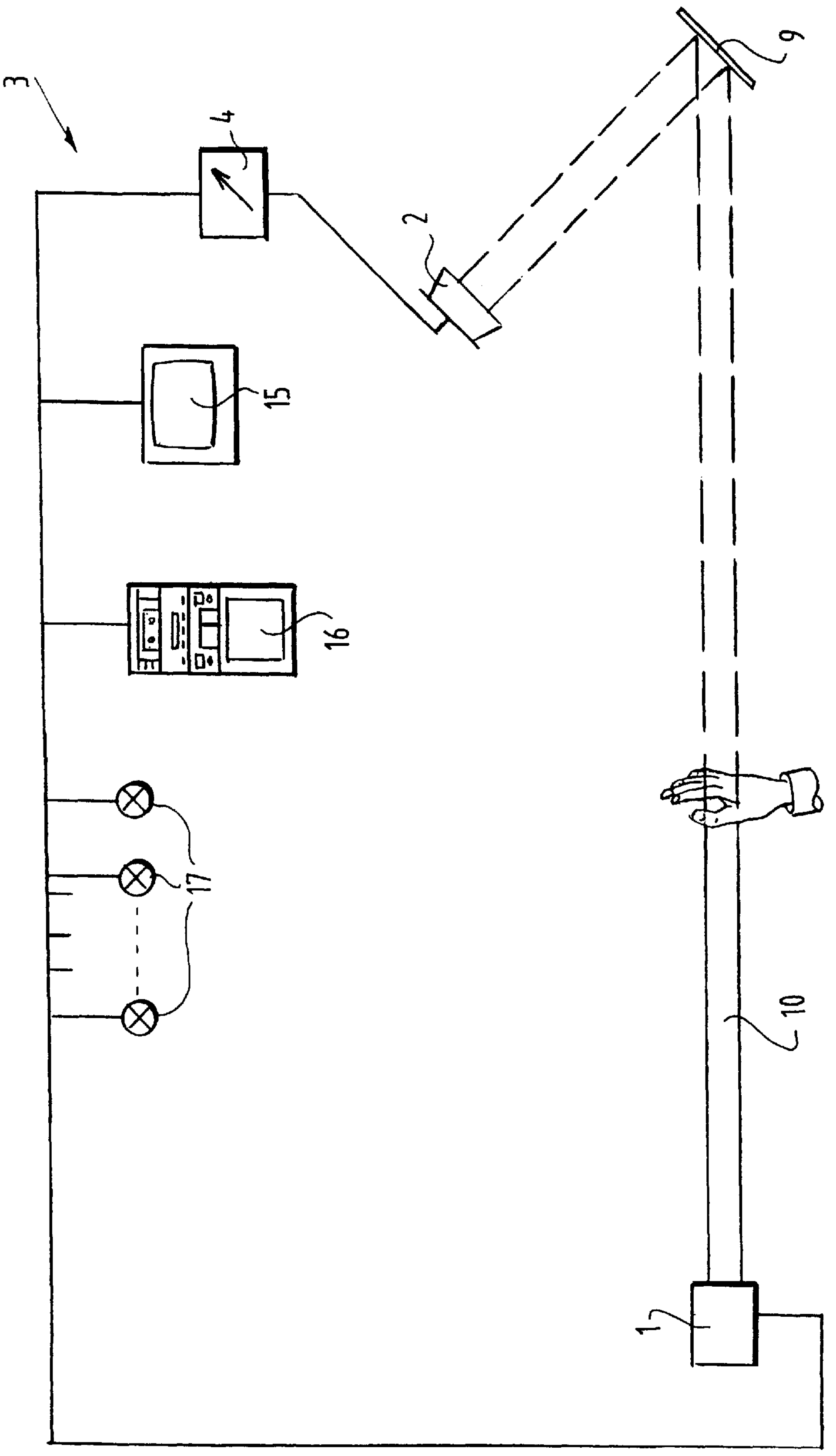
FIG. 6 shows a schematic view of the apparatus according to the invention as an application in the home.

FIG. 6 shows a schematic view of the apparatus according to the invention as an application in the home. A television set 15, a music centre 16 and a number of lamps 17 are included in the control circuit. In order to operate these devices the laser beam 10 generated by light source 1 is wholly or partially masked with the hand. The sensor 2 incorporated in control circuit 3 then responds to the thereby varying light flux. Sensor 2 subsequently generates a signal to the control 4 of control circuit 3. Depending on the duration of the masking and/or the number of successive times the laser beam is masked, the television set 15 is switched on, music centre 16 is switched on, the lights are switched off, the correct channel of the television is switched on, and so on.

It should be noted that it is of course also possible to mask the laser beam using another part of the body or an object such as a stick, instead of with the hand.

The uses of the apparatus and method according to the present invention are of course not limited to the above described embodiments. Use in industry can thus be envisaged, such as the operation of machining devices, chemical installations, computers and so on.

What is claimed is:

1. An apparatus for operating a device, the apparatus comprising:

at least one laser source for generating a continuous operating laser beam which is directed continuously to at least one sensor responding to light flux variations of the laser beam produced between each laser source and each sensor; and a control circuit connected between the device and each sensor for controlling the device as a function of the light flux variation.

2. The apparatus as claimed in claim 1, wherein the control circuit controls the at least one laser source.

3. An apparatus for operating devices such as image, light and/or sound equipment, electromechanical equipment and so on, the apparatus comprising:

at least one laser source for generating a continuous operating laser beam which is directed continuously to at least one sensor responding to light flux variations of the laser beam; and a control circuit containing each sensor for controlling the devices, wherein the at least one sensor is a video camera.

4. An apparatus for operating devices such as image, light and/or sound equipment, electromechanical equipment and so on, the apparatus comprising:

at least one laser source for generating a continuous operating laser beam which is directed continuously to at least one sensor responding to light flux variations of the laser beam; and a control circuit containing each sensor for controlling the devices, wherein:

the control circuit controls the at least one laser source; and the at least one sensor is a video camera.

5. A method for operating a device, the method comprising the steps of:

generating a laser beam from a laser source;

detecting with a sensor light flux variations of the laser beam produced between the laser source and the sensor; and controlling an operation of a device as a function of the detected light flux variations.

6. The method as claimed in claim 5, wherein the laser beam is one of wholly and partially masked.

* * * * *

UNITED STATES PATENT AND TRADEMARK OFFICE

CERTIFICATE OF CORRECTION

PATENT NO. : 6,043,477

DATED : March 28, 2000

INVENTOR(S) : Antonius Stephanus Maria Timmermans

It is certified that error appears in the above-identified patent and that said Letters Patent is hereby corrected as shown below:

Column 3 Line 15 "hi" should read --h1--.

Column 3 Line 24 "hi" should read --h1--.

Signed and Sealed this

Twentieth Day of February, 2001

Attest:

NICHOLAS P. GODICI

*Attesting Officer*

*Acting Director of the United States Patent and Trademark Office*